United States Patent

Okuhara

Patent Number: 5,483,293
Date of Patent: Jan. 9, 1996

[54] OUTPUT CONTROL CIRCUIT CAPABLE OF CARRYING OUT A WIDE VARIETY OF FADE OPERATIONS

[75] Inventor: Yasuhiko Okuhara, Tokyo, Japan

[73] Assignee: NEC Corporation, Japan

[21] Appl. No.: 273,303

[22] Filed: Jul. 11, 1994

[30] Foreign Application Priority Data

Jul. 12, 1993 [JP] Japan .................................. 5-171289

[51] Int. Cl.$^6$ .............................. H04N 5/262; H04N 5/60
[52] U.S. Cl. .......................... 348/595; 348/578; 455/219; 352/91 C
[58] Field of Search ...................... 348/595, 578; 455/219; 352/91 R, 91 C; H04N 5/262, 5/60

[56] References Cited

U.S. PATENT DOCUMENTS 4,006,976  2/1977  Ishiguro ................................ 352/91 C

FOREIGN PATENT DOCUMENTS 303279   12/1990  Japan .............................. H04N 5/262
60581    3/1991   Japan .............................. H04N 5/262
251966   9/1993   Japan .............................. H04N 5/60
90404    3/1994   Japan .............................. H04N 5/262

Primary Examiner—James J. Groody
Assistant Examiner—Glenton B. Burgess
Attorney, Agent, or Firm—Laff, Whitesel, Conte & Saret, Ltd.

[57] ABSTRACT

In an output control device which controls an amplification factor of an amplifier in response to an input signal and a fade control signal to carry out a fade operation of an output signal, such as a fade-in or a fade-out operation, a level control signal is produced to widely control output levels of the output signal. A plurality of timing signals are produced from either the fade control signal or the level control signal and are selected in response to the level control signal and are selected in response to the level control signal to determine a combination of the timing signals. The amplification factor is controlled by the combination of the timing signals to change the output levels over a wide range by varying the combination of the timing signals from one to another.

3 Claims, 7 Drawing Sheets

OUTPUT CONTROL CIRCUIT CAPABLE OF CARRYING OUT A WIDE VARIETY OF FADE OPERATIONS

BACKGROUND OF THE INVENTION

This invention relates to an output control device for use in producing an output signal in response to an input signal, such as an audio signal or a video signal.

In general, it often happens that an input signal, such as an audio or a video signal, is subjected to fade-in or fade-out operation and is produced as an output signal which gradually increases or decreases a tone or an image. In order to realize the fade-in or the fade-out operation, an output control device is included in an audio or a video circuit.

A conventional output control device of the type described is supplied with a fade control signal along with the input signal. Specifically, the fade control signal has a preselected amplitude and is delivered to a time constant circuit which has a predetermined time constant. As a result, a variable amplitude signal is sent from the time constant circuit to an output control circuit during the fade-in or the fade-out operation.

Herein, it is noted that the output control circuit produces a control signal of an invariable level in the absence of the variable amplitude signal. Responsive to the control signal of the invariable level, an amplifier which is given the input signal produces the output signal determined by the invariable level.

On the other hand, when the variable amplitude signal is given from the time constant circuit to the output control circuit, the output control circuit produces the control signal which has a variable amplitude determined by the variable amplitude signal sent from the time constant circuit. Supplied with the control signal of the variable amplitude, the amplifier produces the output signal which has a variable amplitude determined by the control signal.

Herein, it should be noted that the amplitude of the output signal is varied at a constant rate determined by the time constant of the time constant circuit. This means that the fade-in or the fade-out operation is progressive at a constant speed determined by the time constant, which might make a certain person feel uneven.

In addition, a muting operation which quickly mutes a tone can not be realized by the use of the above-mentioned output control device because the tone is varied only at the rate determined by the time constant.

SUMMARY OF THE INVENTION

It is an object of this invention to provide an output control device which is capable of carrying out fade-in or fade-out operation at a wide variety of speeds.

It is another object of this invention to provide an output control device of the type described, which enables a muting operation together with the fade-in or the fade-out operation.

It is still another object of this invention to provide an output control device of the type described, which does not make a person discomfort during the fade-in or the fade-out operation.

An output control circuit to which this invention is applicable is operable in response to an input signal and a fade control signal to produce an output signal which has an output level and which is related to the fade control signal. According to an aspect of this invention, the output control circuit comprises a controllable amplifier supplied with an amplification control signal and the input signal for amplifying the input signal into the output signal under control of the amplification control signal, level control signal producing means for producing a level control signal which specifies a plurality of control levels related to the output level, timing signal producing means supplied with the fade control signal and the level control signal for producing a combination of timing signals appearing at different time instants, and signal supply means coupled to the timing signal producing means for supplying the controllable amplifier with the combination of the timing signals as the amplification control signal.

According to a specific aspect of this invention, the output signal control circuit comprises level control signal producing means for producing a level control signal which is representative of a plurality of control levels related to the output level, a plurality of control levels related to the output level, a plurality of control timing generation means, which are supplied with the fade control signal in parallel and which have a plurality of time constants, for generating a plurality of timing signals determined by the fade control signal and the time constants, selection means supplied with the level control signal and the timing signals for selecting a combination of the timing signals on the basis of the level control signal to produce the combination of the timing signals as a combination of selected timing signals, output control means coupled to the selection means for producing a level control signal which controls the output level of the output signal and which is determined by the combination of the selected timing signals, and an amplifier supplied with the input signal and the level control signal for amplifying the input signal to produce the output signal which has the output level determined by the level control signal.

According to another specific aspect of this invention, the output signal control circuit comprises level control signal producing means for producing a level control signal which is representative of a plurality of levels related to the output level, selection signal producing means supplied with the level control signal producing means for producing a plurality of selection signals in response to the level control signal, timing signal generating means, which is supplied with the fade control signal and the selection signals and which has a plurality of time constants, for producing a combination of selected timing signals determined by the selection signals, output control means coupled to the timing signal generating means for producing a level control signal which controls the output level of the output signal and which is determined by the combination of the selected timing signals, and an amplifier supplied with the input signal and the level control signal for amplifying the input signal to produce the output signal which has the output level determined by the level control signal.

DESCRIPTION OF THE PREFERRED EMBODIMENTS

Figure 1:
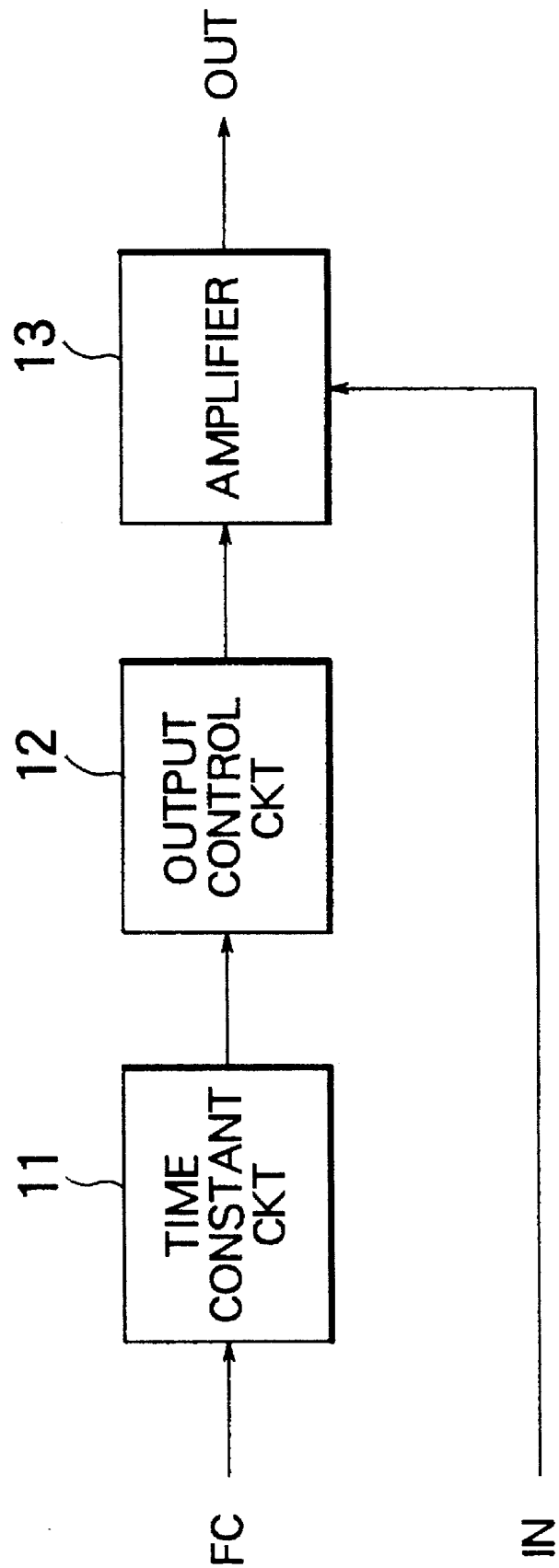
FIG. 1 is a block diagram of a conventional output control device.

Referring to FIG. 1, a conventional output control device is supplied with an input signal IN, such as an audio signal or a video signal, and a fade control signal FC which controls a fade-in or a fade-out operation and which is produced from a fade control signal generator (not shown). In the illustrated example, the output control device comprises a time constant circuit 11 which has a predetermined time constant and which varies the fade control signal FC time in accordance with the predetermined time constant when the fade control signal FC is present. The time constant circuit 11 is connected to an output control circuit 12 which is connected to an amplifier 13 having a amplification factor controllable by the output control circuit 12.

The output control circuit 12 supplies an amplification control signal to the amplifier 13 and varies the amplification factor of the amplifier 13 in response to the amplification control signal.

With this structure, the amplifier 13 amplifies the input signal IN into an output signal OUT at a predetermined amplification factor when the fade control FC is absent. In this event, the output signal OUT has an amplitude equal to predetermined times the input signal IN.

On the other hand, when the fade control signal FC is given to the time constant circuit 11, an output voltage level of the time constant circuit 11 is gradually varied in accordance with the predetermined time constant and becomes equal to a voltage level of the fade control signal FC after lapse of an interval of time determined by the predetermined time constant. This means that a resistance component or value of the output control circuit 12 is gradually varied in accordance with the output voltage level of the time constant circuit 11 and, as a result, the amplification factor is also varied in the amplifier 13.

From this fact, it is readily understood that the fade-in or the fade-out operation is progressive at a constant rate determined by the predetermined time constant. Therefore, the conventional output control device has shortcoming as pointed out in the preamble of the instant specification.

Figure 2:
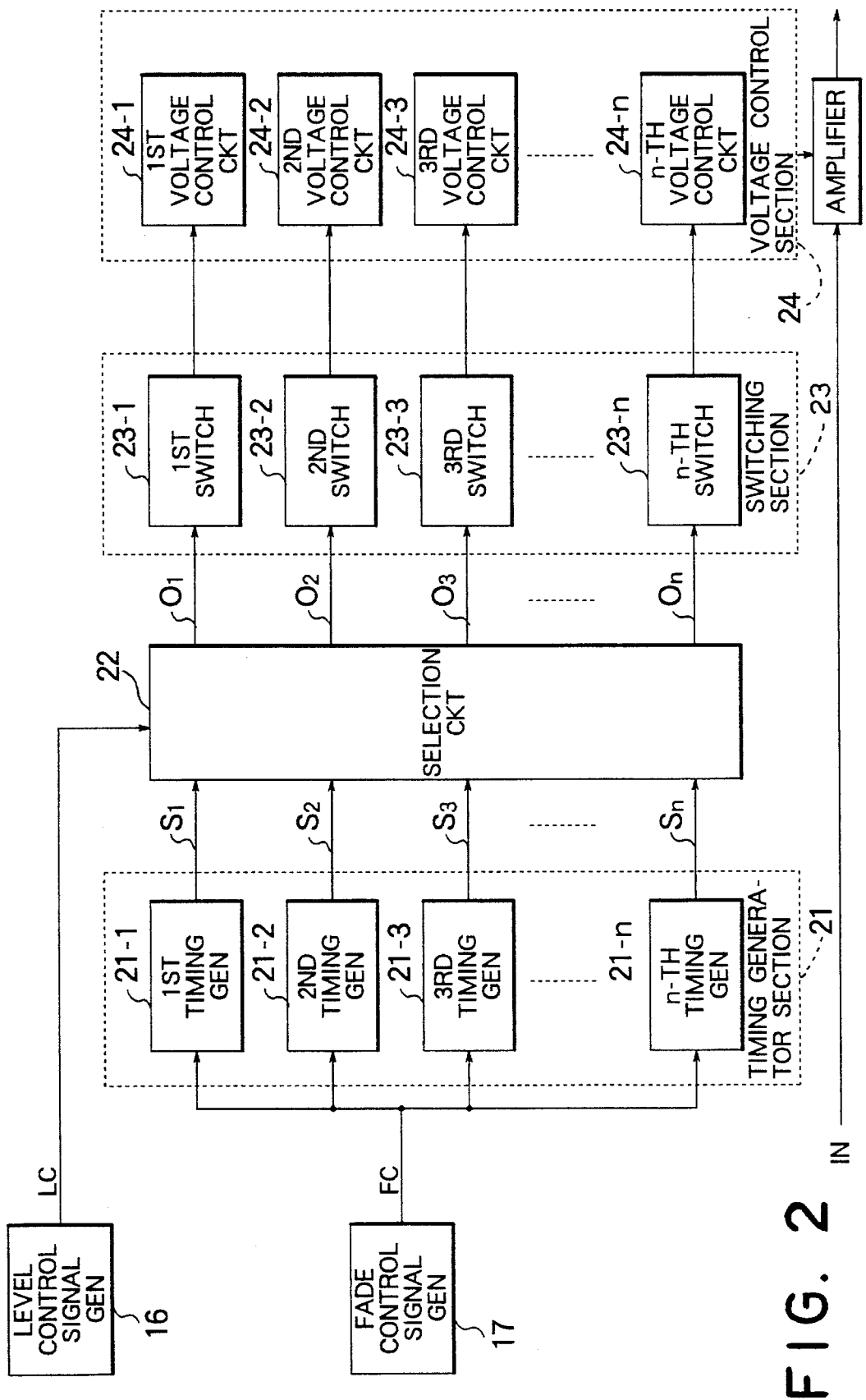
FIG. 2 is a block diagram of an output control device according to a first embodiment of this invention.

Referring to FIG. 2, an output control device according to a first embodiment of this invention is operable in response to the fade control signal FC and the input signal IN like in FIG. 1 and is also operable in response to a level control signal LC. In this connection, the illustrated output control device is connected to a level control signal generator 16 for generating the level control signal LC, as will become clear later, and a fade control signal generator 17 for generating the fade control signal FC in a known manner. The fade control signal FC is indicative of either a fade-in operation or a fade-out operation.

In the illustrated example, the fade control signal FC is delivered to a timing generator section 21 which comprises first through n-th timing generators 21-1 to 21-n. In other words, the fade control signal FC is supplied to the first through the n-th timing generators 21-1 to 21-n in parallel. Each of the first through the n-th timing generators 21-1 to 21-n may be similar in structure to the time constant circuit 11 illustrated in FIG. 1 but has a time constant variable from one another. This shows that the first through the n-th timing generators 21-1 to 21-n produce first through n-th timing signals S1 to Sn which are based on different time constants and which have leading edges appearing at different time instants, as will become clear later.

The first through the n-th timing signals S1 to Sn are sent to a selection circuit 22 along with the level control signal LC which is composed of a plurality of bits to select one or ones of the first through the n-th timing signals S1 to Sn. When the first through the n-th timing signals S1 to Sn are selected by the selection circuit 23, the first through the n-th timing signals S1 to Sn may be produced from the selection circuit 22 as first through n-th selected signals O1 to On, respectively. At any rate, the selection circuit 22 supplies a switching section 23 with the selected signal or signals O1 to On.

In the example being illustrated, the switching section 23 first through n-th switches 23-1 to 23-n selectively supplied with the first through the n-th selected signal O1 to On, respectively. The first through the n-th switches 23-1 to 23-n are selectively switched on or off in response to the first through the n-th selected signals O1 to On.

The switching section 23 is connected to a voltage control section 24 which comprises first through n-th voltage control circuits 24-1 to 24-n a connected to the first through the n-th switches 23-1 to 23-n, respectively. Each of the first through the n-th control circuits 24-1 to 24-n comprises a variable resistor element which is operable as an output control element. Each of the first through the n-th voltage circuits 24-1 to 24-n is put into an active state and in an inactive state when each of the first through the n-th switches 23-1 to 23-n is switched on and off, respectively.

In other words, the first through the n-th voltage control circuits 24-1 to 24-n are selectively put into the active or the inactive states to produce an amplifications control signal determined by a combination of the first through the n-th voltage control circuits 24-1 to 24-n which are put into the active states. the amplification control signal is delivered to an amplifier (depicted at 25) which has an amplification factor determined by the amplification control signal and which may therefore be called a controllable amplifier.

Under the circumstances, the amplifier 25 amplifiers the input signal IN and produces an output signal OUT determined by the amplification factor related to the amplification control signal in a manner to be described later.

With this structure, it is possible to vary the amplification factor over a wide range and to therefore carry out the fade-in or the fade-out operation at various kinds of speed.

Figure 3:
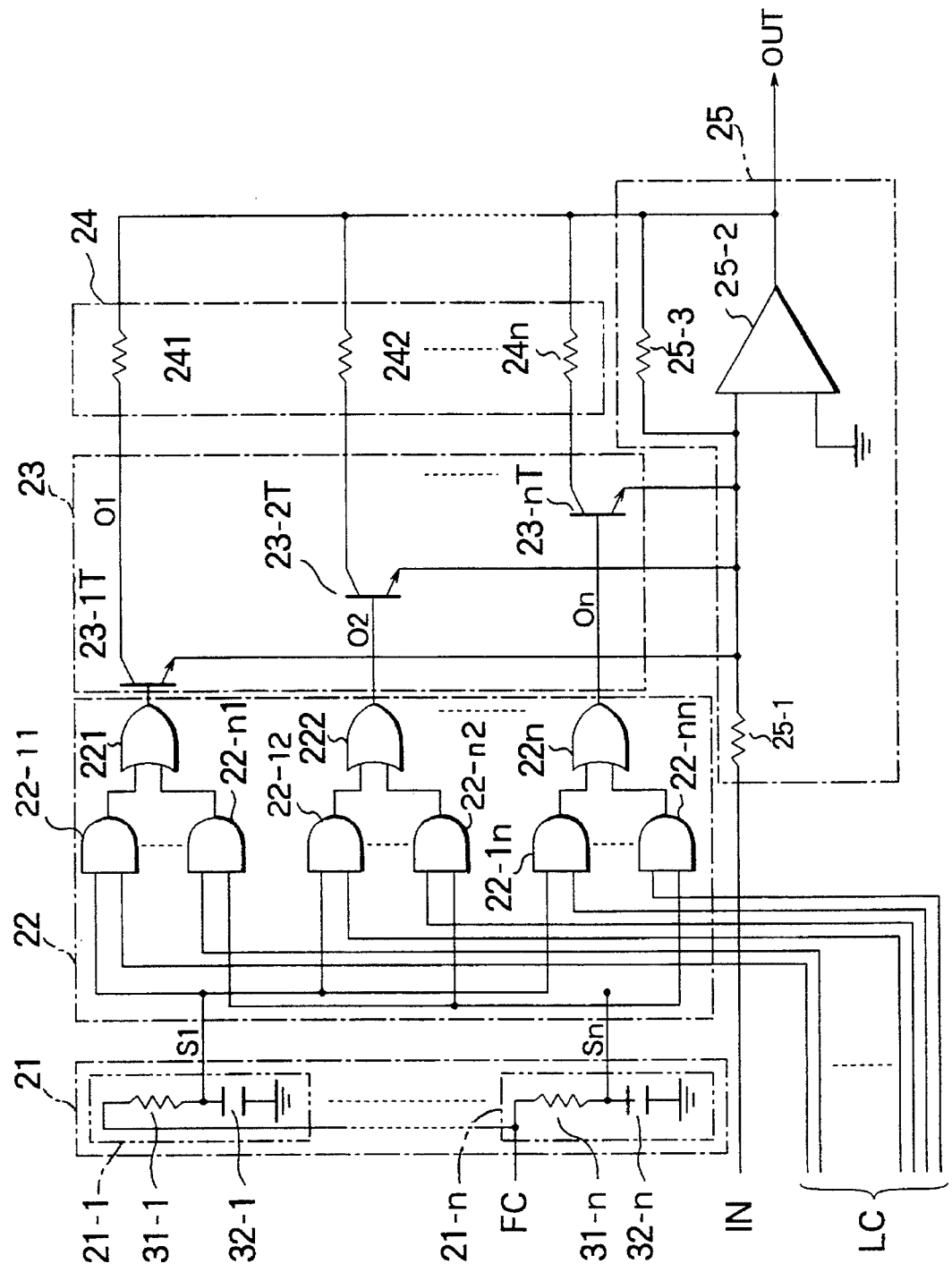
FIG. 3 is a circuit diagram for describing the output control device illustrated in FIG. 2 in detail.

Referring to FIG. 3 together with FIG. 2, the first through the n-th timing generators 21-1 to 21-n included in the timing generator section 21 are similar in structure to one another but have time constants different from one another, as mentioned before. In this connection, the first through the n-th timing generators 21-1 to 21-n comprise series circuits of resistors 31-1 to 31-n and capacitors 32-1 to 32-n, respectively. The first through the n-th timing generators 21-1 to 21-n are supplied with the fade control signal FC in parallel, as shown in FIG. 3.

In addition, points of connections between the resistors 31-1 to 31-n and the capacitors 32-1 to 32-n are connected to the selector circuit 22 to produce the first through the n-th timing signals S1 to Sn. The selector which is given the level control signal LC. In the illustrated selector circuit 22, each of the first through the n-th timing signals S1 to Sn is given to a plurality of AND gates, n in number, such as 22-11 to 22-1n, 22-21 to 22-2n, . . . , and 22-n1 to 22-nn, to which the level control signal LC is supplied. From this fact, it is readily understood that the AND gates 22-11 to 22-nn are equal in number to n2 and that each of first through n-th bits of the level control signal LC is delivered to the AND gates, n in number. A first set of the AND gates 22-11 to 22-n1 is connected to a first OR gate 221 while second through n-th sets of the AND gates 22-12 to n2, 22-1n to 21-nn are connected to second through n-th OR gates 222 to 22n, respectively.

Thus, it may be understood that the level control signal LC specifies a plurality of control levels related to the output voltage level of the output signal OUT.

The switching section 23 comprises the first through the n-th switches 23-1 to 23-n composed of first through n-th transistors to 23-1T to 23-nT which have bases connected to the first through the n-th OR gates 221 to 22n, respectively. The first through the n-th voltage control circuits 24-1 to 24-n are implemented by first through n-th resistors 241 to 24n which are connected to collectors of the first through the n-th transistors 23-1T to 23-nT, respectively, and which are connected in common to the amplifier 25.

The amplifier 25 comprises a resistor 25-1, an operational amplifier 25-2, and a feedback resistor 25-3 connected between input and output terminals of the operational amplifier 25-2. The input signal IN is given to the input terminal of the operational amplifier 25-2 through the resistor 25-1 while emitters of the first through the n-th transistors 23-1T to 23-nT are connected to a point of connection between the resistor 25-1 and the input terminal of the operational amplifier 25-2.

Herein, it is assumed that the fade-out operation is executed by the output control device illustrated in FIGS. 2 and 3. In this case, let the fade control signal FC be changed from a low level "L" to a high level "H". On the other hand, let the fade control signal FC be changed from the high level "H" to the low level "L" when the fade-in operation is executed.

During the fade-out operation, the fade control signal FC of the high level "H" is sent to the first through the n-th timing generators 21-1 to 21-n to be gradually increased in accordance with the time constants determined by the capacitors 32 and the resistors 31 of the first through the n-th timing generators 21-1 to 21-n. This means that the fade control signal FC is delayed by the first through the n-th timing generators 21-1 to 21-n by time intervals determined by the time constants of the respective timing generators 21-1 to 21-n and is produced as first through n-th timing signals S1 to Sn which may be called first through n-th provisional timing signals for convenience of description.

Specifically, the first through the n-th timing signals S1 to Sn appear at time instants different from one another to be sent to the selector circuit 22. Specifically, the first through the n-th timing signals S1 to Sn are produced as a result of a gradual increase of the fade control signal FC. At any rate, the first through the n-th timing signals S1 to Sn are selected by the first through the n-th bits of the level control signal LC to be selectively sent through the OR gates 221 to 22n to the first through the n-th switches composed of the first through the n-th transistors 23-1T to 23-nT (FIG.3). Thus, the first through the n-th transistors 23-1T to 23nT are selectively switched by the first through the n-th timing signals S1 to Sn to selectively produce the first through the n-th selected timing signals O1 to On. In other words, a combination of the first through the n-th selected timing signals O1 to On is changed by the level control signal LC and may be referred to as timing signals. Thus, the timing generator section 21 and the selection circuit 22 may be collectively called a timing signal producing circuit.

For example, it is surmised that the first through the third timing signals S1 to S3 successively appear in the order of the first through the third timing signals S1 to S3 and that the level control signal LC successively selects the first through the third timing signals S1 to S3, respectively. In this event, the first timing signal S1 is produced as the first selected timing signal O1. Subsequently, the second timing signal S appears as the second timing signal O2 while the third timing signal S3 appears as the third selected timing signal O3. A combination of the first through the third selected timing O1 to O3 is varied with time in accordance with the level control signal LC. In the above-mentioned example, the first through the third selected timing signals O1 to O3 may be combined together or may be singly produced. This shows that the levels of the amplification control signal can be widely changed in comparison with the conventional output control device illustrated in FIG. 1.

In any event, the fade-out operation can be made by a gradual decrease of the amplification factor in the amplifier 25. This is because the amplification factor of the amplifier 25 is reduced with a decrease of a resistance value of the voltage control section 24.

More specifically, attenuation of the switching section 23 is varied with time and is determined by the order of the first through the n-th transistors 23-1T to 23-nT which are successively turned on.

Figure 4:
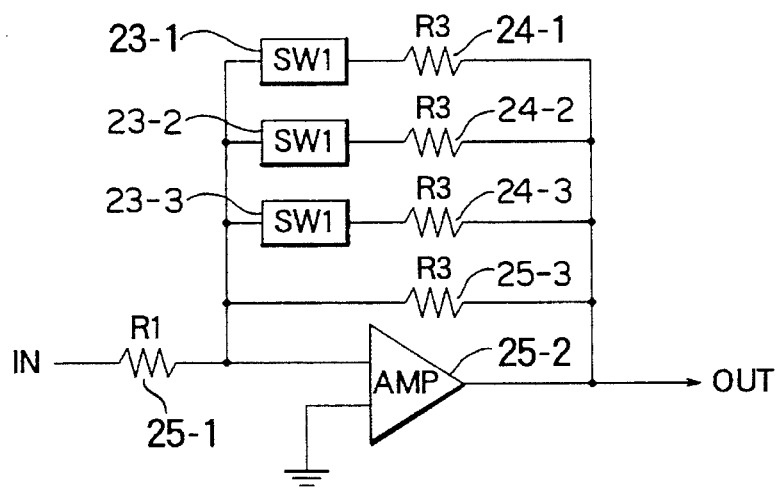
FIG. 4 is a simplified circuit diagram of the output control device illustrated in FIG. 2.

Referring to FIGS. 3 and 4 together with FIGS. 2 and 3, let the fade-out operation to be described in detail on the assumption that n is equal to three. In FIG. 4, similar parts are designated by like reference numerals in FIGS. 2 and 3. In the example being illustrated, the resistors 25-1, 25-3, 24-1, 24-2, and 24-3 are assumed to have resistance values of R1, R2, R3, R4, and R5, respectively, while the first through the third switches 23-1 to 23-3 are depicted at SW1 to SW3, respectively. Moreover, it is presumed that the first through the third transistors 23-1T to 23-3T of the first through the third switches 23-1 to 23-3 are successively switched on in the order of SW1, SW2, and SW3.

Under the circumstances, let a combined resistance value Z between the input and the output terminals of the operational amplifier 25-2 be given by:

$$Z = R2,$$
(when SW1 to SW3 are put into off states)
$$Z = R2\ R3/(R2 + R3),$$
(when SW1 is switched on)
$$Z = R2\ R3\ R4/(R2\ R3 + R2\ R4 + R3\ R4),$$
(when SW1 and SW3 are switched on) and
$$Z = R2\ R3\ R4\ R5/(R2\ R3\ R4 + R2\ R3\ R5 + R3\ R4\ R5 + R2\ R4\ R5).$$
(when SW1 to SW3 are switched on)

Herein, the resistance values R1 to R5 assumed to become equal to 1 kilohm, 1 kilohm, 1 kilohm, 2 kilohms, and 3 kilohms, respectively.

In this case, the combined resistance value Z is gradually and successively changed in the order of 1 kilohm, 500 ohms, 400 ohms and 350 ohms. This shows that an output voltage Vout of the output signal OUT is represented by:

$$Vout = Vin \times (Z/R1), \qquad (1)$$

where Vin represents an input voltage of the input signal IN and (Z/R1) represents a resistance ratio.

Figure 5:
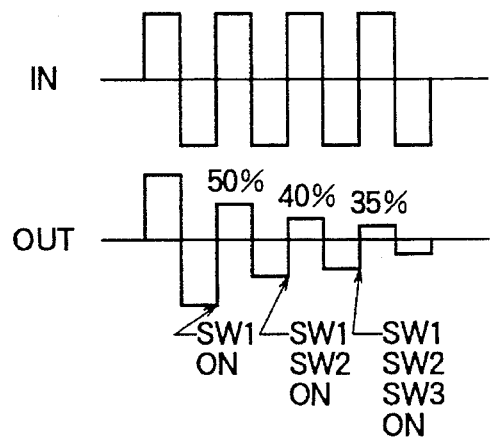
FIG. 5 shows a time chart for use in describing a fade-in operation of the output control device shown in FIG. 4.

As is apparent from the above, the resistance ratio is successively varied in the order of 1, 0.5, 0.4, and 0.35 and the output voltage Vout is changed relative to the input voltage Vin in the manner illustrated in FIG. 5.

Figure 6:
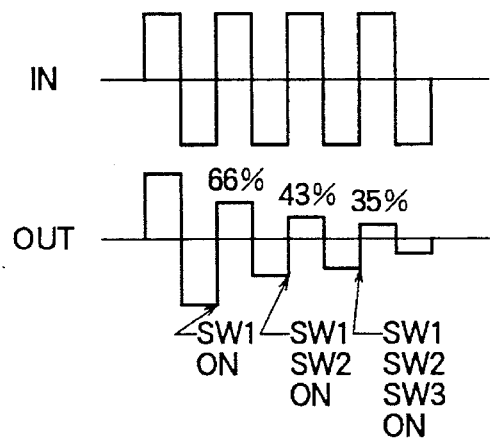
FIG. 6 shows another time chart for use in describing another fade-in operation of the output control device shown in FIG. 4.

Referring to FIG. 6, let the first through the third transistors 23-1T to 23-3T be turned into on-states in the order of SW2, SW3, and SW1. In this event, the combined resistance values Z are given by:

$Z = R2$,
(when SW1 to SW3 are switched off)
$Z = R2 \, R4/(R2 + R4)$,
(when SW2 is switched on)
$Z = R2 \, R4 \, R5/(R2 \, R4 + R2 \, R5 + R4 \, R5)$,
(when SW2 and SW3 are switched on) and
$Z = R2 \, R3 \, R4 \, R5/(R2 \, R3 \, R4 + R2 \, R3 \, R5 + R3 \, R4 \, R5 + R2 \, R4 \, R5)$.
(when SW1 to SW3 are switched on)

From the above equations, it is readily understood that the combined resistance values Z are varied in the order of 1 kilohm, 660 ohms, 430 ohms, and 350 ohms.

Therefore, the output voltage Vout of the output signal OUT is varied relative to the input voltage Vin in the manner illustrated in FIG. 6.

Thus, it is possible to vary an attenuation factor in the output voltage Vout by changing the order of switching the transistors from one to another and to widely change fade-out levels by locating the selector circuit 22 between the timing generator section 21 and the switching section 23.

On the other hand, let the fade-in operation be executed by the use of the output control device illustrated in FIG. 2. During such a fade-in operation, the output signal OUT gradually increases in its level and is thereafter kept at an invariable level. As mentioned before, the fade control signal FC is changed from the high level "H" to the low level "L". For brevity of description, the number n is assumed to be equal to three, like in the above examples.

Figures 7, 8:
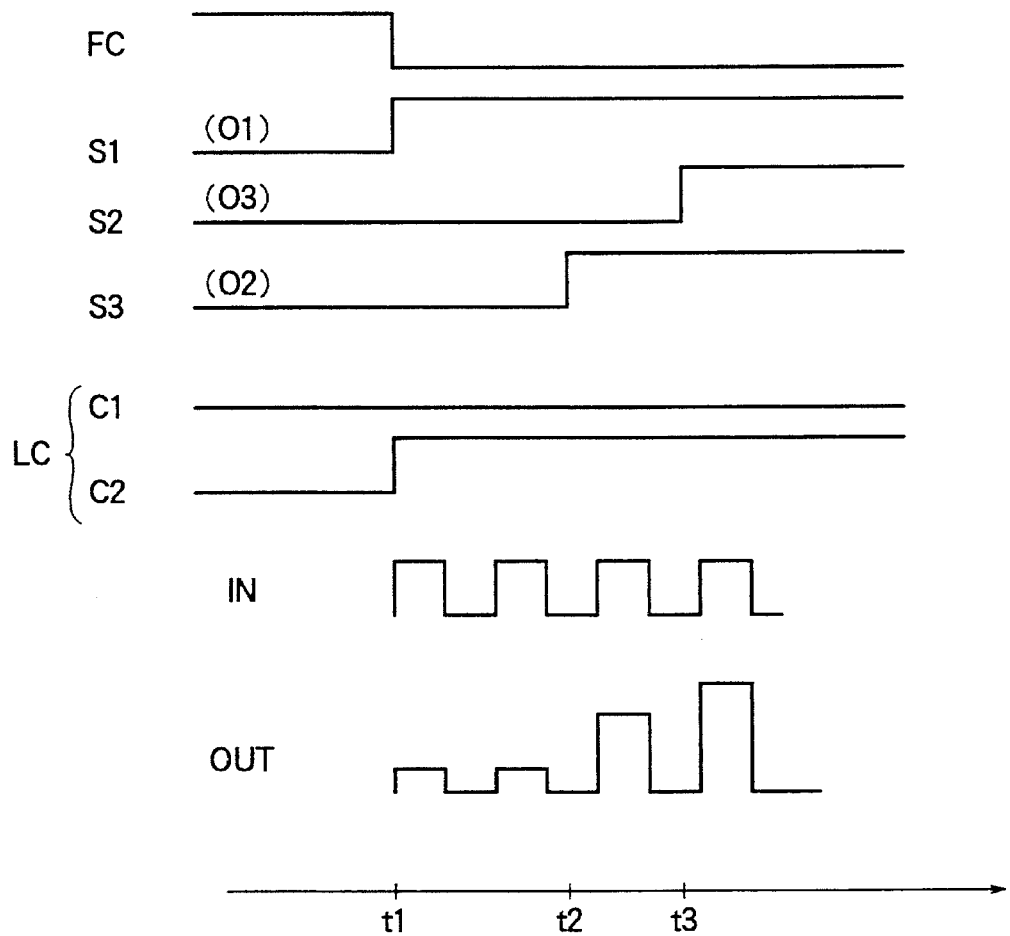
FIG. 7 shows a time chart for use in describing a fade-out operation of the output control device illustrated in FIGS. 2 and 3.
FIG. 8 shows a signal relationship for use in describing operation of a selection circuit included in the output control device of FIGS. 2 and 3.

Referring to FIG. 7 in addition to FIG. 2, the fade control signal FC is changed from the high level "H" to the low level "L" at a first time instant t1, as shown in FIG. 7. In the example being illustrated, the level control signal LC is composed of first and second bits C1 and C2 to determine a selection condition of the first through the third timing signals S1 to S3 and to produce the selected timing signals O1 to O3. As shown in FIG. 7, the first bit C1 continuously takes the low level "L" while the second bit C2 is changed from the low level "L" to the high level "H" at the first time instant t1.

As illustrated in FIG. 7, the fade control signal FC is kept at the high level "H" and only the second bit C2 of the level control signal LC is kept at the high level "H". In addition, the first timing signal S1 is changed to the high level "H" at the first time instant t1 and the third timing signal S3 is changed to the high level "H" at a second time instant t2. Finally, the third timing signal S3 is changed to the high level "H" at a third time instant t3.

Under the circumstances, the selection circuit 22 is operable to produce the first, the second, and the third timing signals S1 to S3 as the first, the third, and the second selected timing signals O1, O3, and O2, respectively. In other words, the first, the third, and the second switches 22-1, 22-3, and 22-2 are successively switched on in the switching section 23 illustrated in FIG. 2. This brings about a gradual increase of the resistance value of the voltage control section 24. As a result, the voltage level of the output signal OUT is gradually increased with time, as shown along a bottom line of FIG. 7.

Temporarily referring to FIG. 8, the first and the second bits C1 and C2 of the level control signal LC are related to the first through the third selected timing signals O1, O2, and O3. Specifically, when the first and the second bits C1 and C2 take the high and the low levels "H" and "L", respectively, as shown along the second row of FIG. 8, the second, the first, and the third timing signals S2, S1, and S3 are sent through the selection circuit 22 as the first, the second, and the third selected timing signals O1, O2, and O3, respectively. In the illustrated example, the first through the third selected timing signals O1 to O3 may be successively produced in the this order.

When both the first and the second bits C1 and C2 take the high levels "H", the third, the second, and the first timing signals S3, S3, and S1 are selected as the first, the second, and third selected timing signals O1, O2, and O3, as shown along the third row of FIG. 8.

Figure 9:
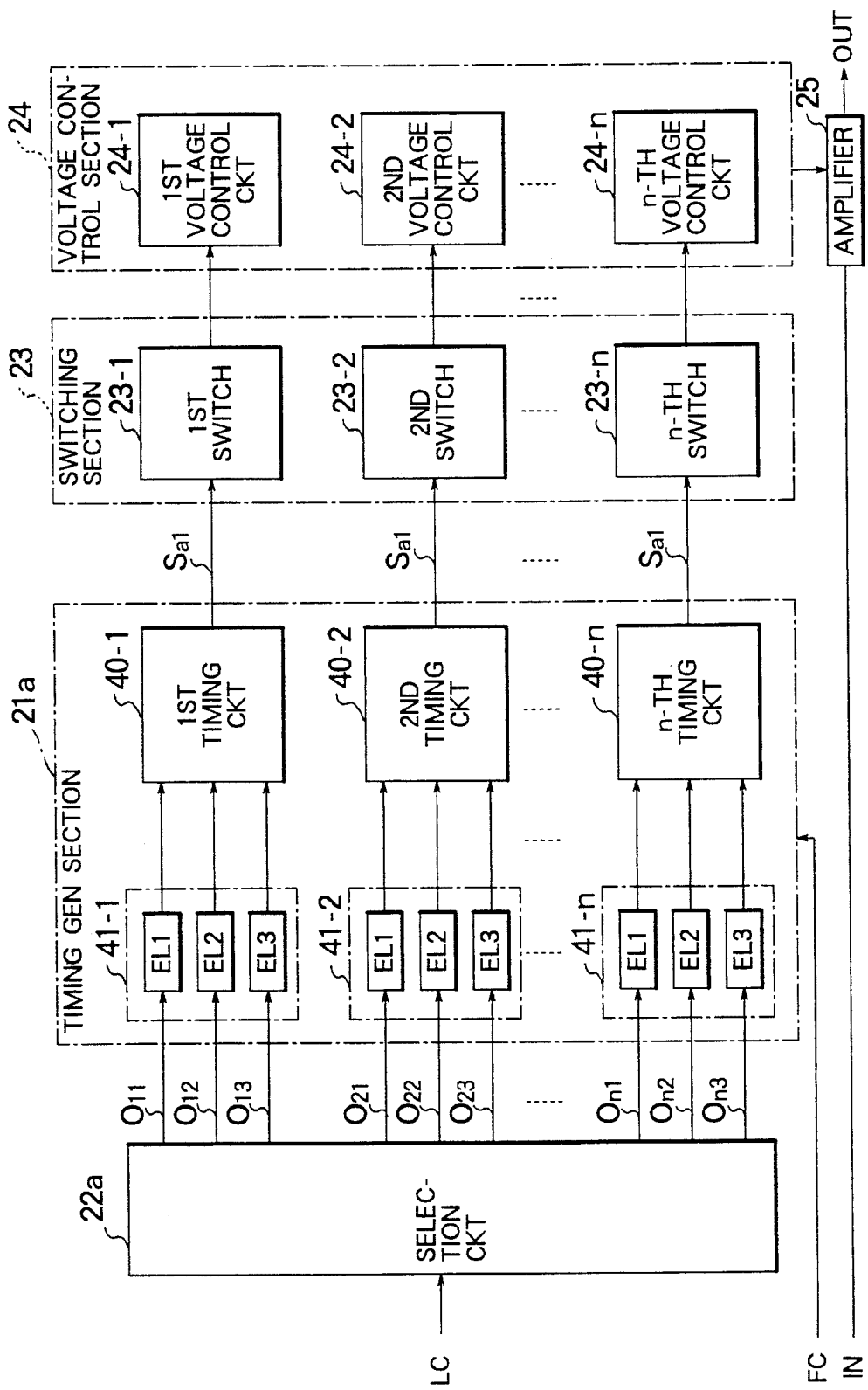
FIG. 9 is a block diagram of an output control device according to a second embodiment of this invention.

Referring to FIG. 9, an output control device according to a second embodiment of this invention comprises similar parts and signals designated by like reference numerals and symbols. In FIG. 9, the selection circuit and the timing generator section are changed from those illustrated in FIG. 2 and are therefore shown by 22a and 21a, respectively. Herein, the timing generator section 21a comprises first through n-th timing circuits 40-1 to 40-n and first through n-th time constant circuits 41-1 to 41-n preceding the first through the n-th timing circuits 40-1 to 40-n, respectively.

In the illustrated example, the first time constant circuit 41-1 comprises first through third time constant elements EL1 to EL3 which have time constants different from one another and which may be constituted by capacitors. Likewise, the second through the n-th time constant circuits 41-2 to 41-n comprise first through third time constant elements EL1 to EL3 which may have time constants different from those of the first time constant elements EL1 to EL3 and from one another. Alternatively, the first through the third time constant elements EL1 to EL3 of the first time constant circuit 41-1 may be equal to those of each of the remaining time constant circuits 41-2 to 41-n, respectively.

On the other hand, the selection circuit 22a is supplied with the level control signal LC of a plurality bits, as explicitly described in conjunction with FIG. 3, and selects either one of the first through the third time constant elements EL1 to EL3 of each of the first through the n-th time constant circuits 41-1 to 41-n. The selection circuit 22a may select two or three elements of each time constant circuit 41-1 to 41-n. At any rate, the selection circuit 22a selectively sends selection signals O11 to O13, O21 to O23, ..., On1 to On3 to the first through the n-th time constant circuits 41-1 to 41-n in response to the level control signal LC.

Responsive to the selection signals O11 to On3, the first through the n-th time constant circuits 41-1 to 41-n supply the first through the n-th timing circuits 40-1 to 40-n with first through n-th enable signals after lapse of time intervals determined by the time constants of the selected time constant elements.

Supplied with the enable signals, the first through the n-th timing signals 40-1 to 40-n supply the first through the n-th switches 23-1 to 23-n with first through n-th selected timing signals depicted at Sa1 to San. The first through the n-th switches 23-1 to 23-n are turned into on-states in response to the first through the n-th selected timing signals Sa1 to San to control the first through the n-th voltage control circuits 24-1 to 24-n, respectively. Consequently, the amplification factor of the amplifier 25 is controlled by the first through the n-th voltage control circuits 24-1 to 24-n in the manner mentioned in conjunction with FIGS. 2 and 3.

With this structure, the first through the n-th timing circuits 40-1 to 40-n are directly connected to the first through the n-th switches 23-1 to 23-n without intervention of the selection circuit 22 illustrated in FIG. 2. Moreover, each resistance value of the first through the n-th voltage control circuits 24-1 to 24-n is determined only by the time constants of the timing generator section 21a which are variable. Such a variation of time constants brings about a change in a switching order of the first through the n-th switches 23-I to 23-n from one to another and selectively put the first through the n-th voltage control circuits 24-1 to 24-n into either an enabled state or a disabled one at different time instants.

Specifically, either one of the time constant elements, namely, capacitors EL1 to EL3 may be selected by the selection circuit 22a in each of the first through the n-th time constant circuits 41-1 to 41-n. As a result, the amplification factor of the amplifier 25 is determined by a combination of the selected time constant elements. This shows that a voltage level of the output signal OUT is varied in dependency upon the combination of the selected time constant elements and that the output control device illustrated in FIG. 9 carries out fade-in and fade-out operations in a manner similar to that described with reference to FIGS. 2 and 3.

Now, description will be at first made about the fade-out operation of the output control device shown in FIG. 9. In this event, it is assumed that the fade control signal FC is changed from the low level "L" to the high level "H" while the level control signal LC is produced to successively select the first time constant elements EL1 of the first through the n-th time constant circuits 41-1 to 41-n. Under the circumstances, the first selected timing signal Sa1 is at first sent from the first timing circuit 40-1 to the first switch 23-1 and the second through the n-th selected timing signals Sa2 to San are thereafter successively sent from the second through the n-th timing circuits 40-2 to 40-n to the second through the n-th switches 23-2 to 23-n, respectively. Therefore, the first through the n-th switches 23-1 to 23-n are successively switched on to put the first through the n-th voltage control circuits 24-1 to 24-n into enable states.

Consequently, a total resistance value of the voltage control section 24 is gradually reduced with time in dependency upon the number of the voltage control circuits 24-1 to 24-n put into the enabled states. Accordingly, the output voltage Vout of the amplifier 25 is gradually attenuated and finally reduced to a zero volt. Thus, the fade-out operation is executed by the illustrated output control device.

Next, description will be made about the fade-in operation of the output control device illustrated in FIG. 9. For simplification of description, let the number n be equal to three.

Figures 10, 11:
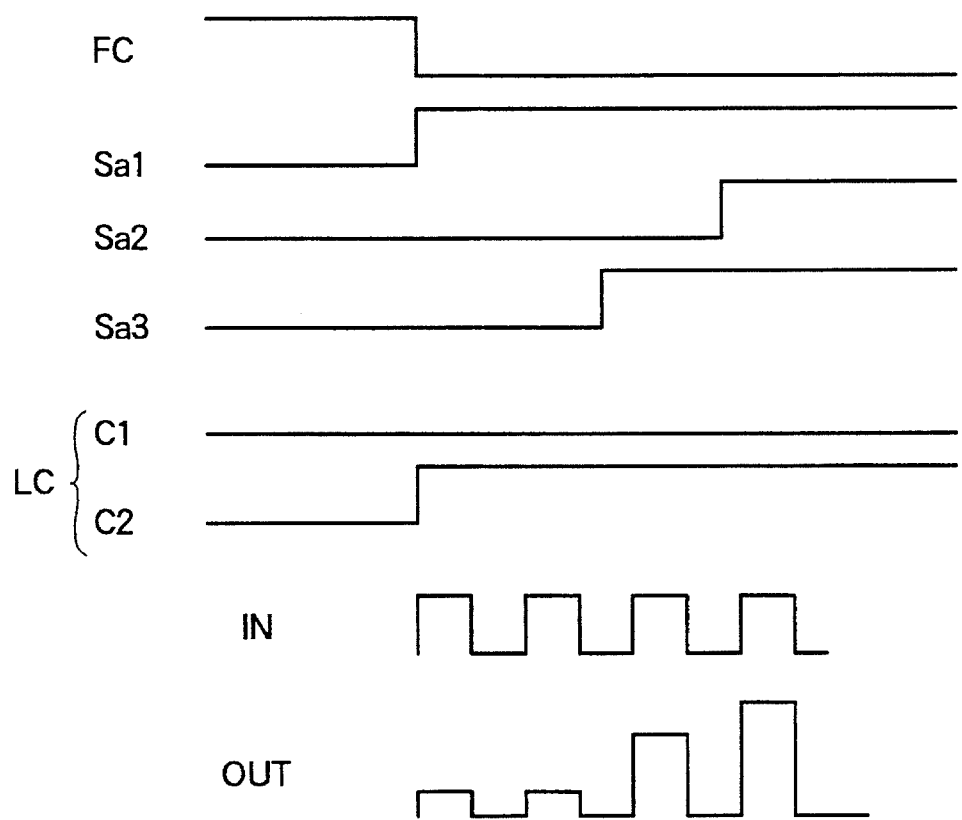
FIG. 10 shows a time chart for use in describing a fade-in operation of the output control device illustrated in FIG. 9.
FIG. 11 shows a signal relationship for use in describing operation of a timing generator section included in the output control device illustrated in FIG. 9.

Referring to FIG. 10, it is surmised that the fade control signal FC is changed from the high level "H" to the low level "L" at the first time instant and that the level control signal LC is composed of the first bit C1 of the low level "L" and the second bit C2 of the high level "H", as shown in FIG. 10. Furthermore, it is also presumed that, when the first bit C1 and the second bit C2 take the low level "L" and the high level "H", respectively, the first through the third time constant circuits 41-1 to 41-3 select the first, the second, and third time constant elements EL1, EL2, and EL3, respectively. When the second time constant element EL2 gives a time constant longer than the first and the third time constant elements EL1 and EL3 and the third time constant element EL3 gives a time constant longer than the first time constant element EL1, the first, the third, and the second selected timing signals Sa1, Sa3, and Sa2 are successively produced from the first, the third, and the second timing circuits 40-1, 40-3, and 40-2, as shown in FIG. 10.

Inasmuch as the fade control signal FC is put into the low level "L" at the first time instant t1, the first, the third, and the second timing circuits 40-1, 40-3, and 40-2 are successively turned off to put the first, the third, and the second switches 23-1, 23-3, and 23-2 into off-states. Therefore, a total resistance value of the voltage control section 24 is gradually increased with time, which results in a gradual increase of the output voltage Vout of the output signal OUT, as shown along a bottom line of FIG. 10.

Since the total resistance value of the voltage control section 24 is changed over a very wide range by varying the time constants in the first through the third time constant circuits 41-1 to 41-3, a wide variety of the fade-in operations can be accomplished by the illustrated output control device.

Referring to FIG. 11, illustration is made as regards a relationship between the first and the second bits C1 and C2 of the level control signal LC and the time constant elements selected in the first through the third time constant circuits 41-1, 41-2, and 41-3.

As shown in FIG. 11, when the first and the second bits C1 and C2 take the high and the low levels "H" and "L", respectively, the second, the third, and the first time constant elements EL2, EL3, and EL1 are selected in the first through the third time constant circuits 41-1, 41-2, and 41-3, as illustrated along the second row of FIG. 11.

When the first and the second bits C1 and C2 take the high levels "H", the third, the first, and the second time constant elements EL3, EL1, and EL2 are selected in the first through the third time constant circuits 41-1 to 41-3, as shown in the third line of FIG. 11.

While this invention has thus far been described in conjunction with a few embodiments thereof, it will be readily possible for those skilled in the art to put this invention into practice in various other manners. For example, muting operation is also possible by simultaneously putting all of the switches 23-1 to 23-n into the on-states to render the total resistance value of the voltage control section 24 into a minimum value. Similar fade operation can be accomplished by directly switching the resistors 241 to 24n (FIG. 3) from one to another.

What is claimed is:

1. An output control circuit operable in response to an input signal and a fade control signal in order to produce an output signal which has an output level and which is related to said face control signal, said output control circuit comprising:

a fade control signal generator for generating a fade control signal formed by a single bit;

first through n-th time constant circuits, each of said time constant circuits having time constants which are different from one another, where n is an integer greater than unity, and said time constant circuits being supplied with said fade control signal for generating first through n-th provisional timing signals which are varied in amplitude with time in response to said different time constants;

a gate circuit supplied with said first through said n-th provisional timing signals and with said fade control signal for generating first through n-th binary signals which have leading and trailing edges that are different from one another;

first through n-th transistor circuits which are selectively switched on in response to said first through said n-th binary signals;

means comprising first through n-th resistor circuits connected to said first through said n-th transistor circuits for producing a control signal determined by a combination of said switched-on transistors; and a controllable amplifier supplied with said input signal and connected to said first through said n-th control signal producing means for amplifying said input signal in response to said control signal.

2. An output control circuit as claimed in claim 1, wherein said fade control signal is indicative of a selected one of fade-out and fade-in operations for fading out and in said output signal.

3. An output control device operable in response to an input signal and to a fade control signal to produce an output signal which is controlled in level by the fade control signal to produce an output level, said output signal control circuit comprising:

level control signal producing means for producing a level control signal which is representative of a plurality of levels related to said output level;

selection signal producing means supplied with said level control signal producing means for producing a plurality of selection signals in response to said level control signal;

timing signal generating means, which is supplied with said fade control signal and said selection signals and which has a plurality of time constants, said timing signal generating means producing a combination of selecting timing signals responsive to selection signals;

output control means coupled to said timing signal generating means for producing a level control signal which controls the output level of the output signal and which is determined by said combination of the selected timing signals; and an amplifier supplied with said input signal and said level control signal which has the output level determined by said level control signal.

* * * * *